Sept. 5, 1967 — A. S. CANN — 3,339,388
MULTIPLE SIZE RECTILINEAR TUBE BEADING TOOL
Filed Sept. 8, 1964
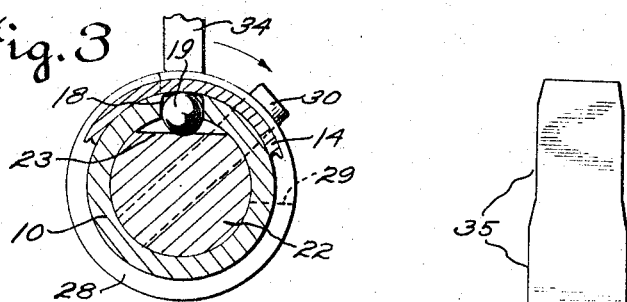
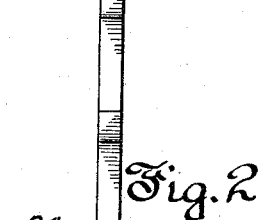
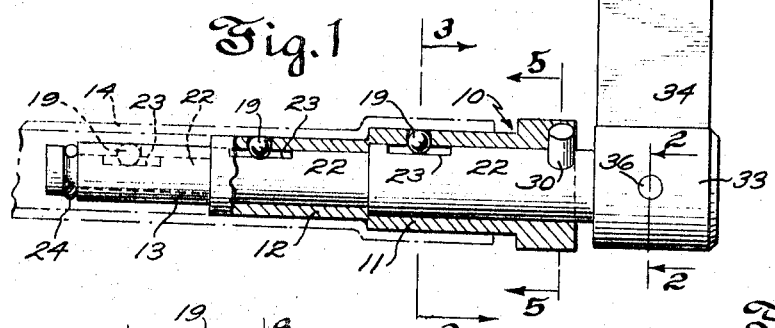
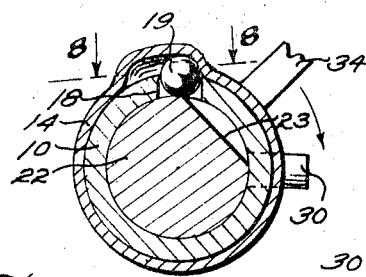
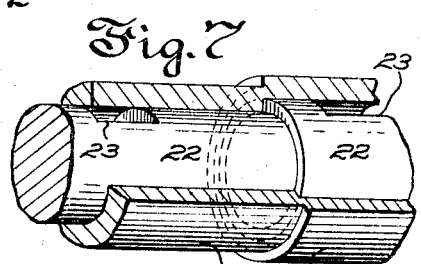
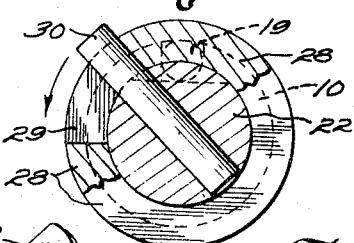
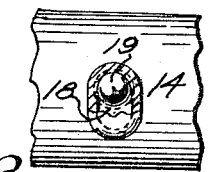
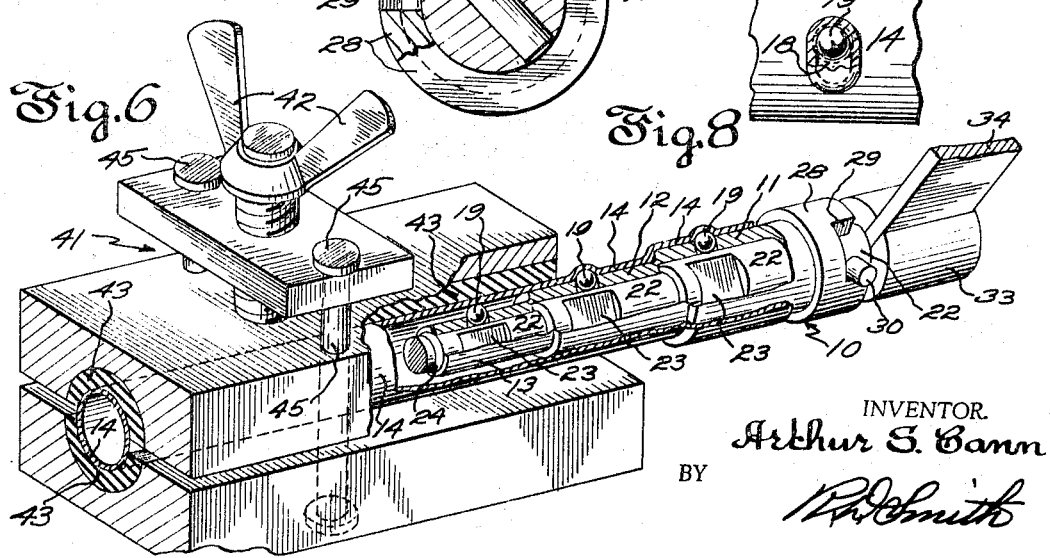
INVENTOR.
Arthur S. Cann
BY
R. D. Smith
ATTORNEY

United States Patent Office 3,339,388
Patented Sept. 5, 1967

3,339,388
MULTIPLE SIZE RECTILINEAR TUBE
BEADING TOOL
Arthur S. Cann, 62 Pond Point Ave.,
Milford, Conn. 06460
Filed Sept. 8, 1964, Ser. No. 394,819
6 Claims. (Cl. 72—75)

ABSTRACT OF THE DISCLOSURE

A unitary tool for embossing circumferential beads in the cylindrical wall of different size work tubes wherein plural embossing balls are operated by plural camming surfaces on a single core rod that is rotatable about a single axis within a single hollow mandrel at stations spaced apart axially therealong, said balls cooperating with said camming surfaces at tube embossing stations located at different radial distances from the single tool axis.

---

This invention relates to a portable hand tool of unique compactness and improved efficiency capable of simultaneously embossing a plurality of outward projecting circumferential beads in differing profile sizes of cylindrical tubing.

It has been proposed heretofore to provide a hand tool capable of embossing a bead in a tube of uniform size adapted to fit the hand tool, but in actual practice a plurality of tube sizes are often encountered in the field. This has made it necessary to carry about a set of different size tools to accomplish the beading of the walls of different size tubing.

An object of this invention is to provide an improved unitary and preferably rectilinear hand tool capable of beading simultaneously a variety of sizes of wall portions of a single tube, or beading various sizes of plain tubes by the use of the single rectilinear tool.

Another object is to provide a unitary tool having these capabilities comprised of as few as three or four relatively movable parts.

Another object is to provide a core rod journaled within a mandrel, each being stepped to afford mutually abutting thrust shoulders for determining and maintaining a fixed axial relationship of the rod to the mandrel while being turned to emboss a bead in an encompassing tubular wall.

Another object is to make the core rod and mandrel of correspondingly diminishing size toward the end of the tool that is to be inserted in the tubing for forming a bead therein.

These and other objects of the present improvements will become clear in fuller particular from the following description of a preferred embodiment of the invention having reference to the appended drawing wherein:

FIG. 1 is a view in elevation showing partly in vertical section a hand tool embodying the invention for beading tubing.

FIG. 2 is a view of the tool as seen from its handle end and shown partly in section on the plane 2—2 in FIG. 1.

FIG. 3 is an enlarged view taken in section on the plane 3—3 in FIG. 1 looking in the direction of the arrows showing one of the embossing balls in retracted position.

FIG. 4 is a view like FIG. 3 showing the embossing ball cammed outward into bead forming position.

FIG. 5 is a view on the same scale as FIG. 4 taken partially in section on the plane 5—5 in FIG. 1 looking in the direction of the arrows.

FIG. 6 is a perspective view of the tool being used to form two circumferential beads simultaneously in two adjacent portions of tubing having respectively different diameters, parts being broken away for clearness.

FIG. 7 is a fragmentary view showing on an enlarged scale a shouldered junction of adjacent mandrel and core rod interfitting portions.

FIG. 8 is a detail view of the embossing ball viewed in part on the section plane 8—8 in FIG. 4.

In the drawings the present improvements are shown to be embodied in a rectilinear unitary portable hand tool whose major parts comprise a hollow stepped mandrel or barrel 10 comprising endwise adjacent coaxial cylindrical wall portions 11, 12 and 13 of diminishing sizes each having differing internal and external girths adapted to enter and occupy the open mouth of blank tubing 14. As shown in FIG. 1 the tubing to be beaded may be of different girths in adjacent constituent portions of the mouth of the tubing.

Each of the different size portions 11, 12 and 13 of the mandrel wall contains a lateral round opening 18 occupied by an embossing element 19 having a sufficiently loose fit to be shiftable within the opening in a radial direction relative to the common axis of wall portions 11, 12 and 13. As will hereinafter appear the embossing elements are of antifrictional nature and may comprise small hard rollers or balls 19 which are free to drop inward of the mandrel wall to positions in which the balls do not protrude outward from the external surface of the mandrel. Each ball is precluded from falling outward from the opening beyond the position shown in FIG. 3 by means of a peaned circumferential lip which reduces the size of the opening to a slightly smaller diameter than that of the ball.

Balls 19 are limited in their retractive shifting movement inward of the mandrel wall by a stepped cylindrical core rod 22 whose peripheral surfaces are of different girths and are journaled respectively in the wall portions 11, 12 and 13 of the mandrel. In each of the peripheral surfaces of the core rod there is incorporated a camming surface 23 which in the particular construction here shown comprises a simple flat groove 29 extending crosswise the core rod and located axially in register with one of the balls 19. The flats 29 are of sufficient width and depth to permit each ball to shift inward of the mandrel wall sufficiently far to fall flush with the external surface of the wall so that a length of tubing may be beaded whose internal diameter is such as to sleeve snugly over one or more of the mandrel wall portions and encompass the mandrel with a rotation permitting fit. The stepped core rod 22 is longer than the mandrel 10 and is retained axially therein by a split spring clip 24 removably nested in an annular groove at the small end of the core rod which protrudes from the mandrel.

Mandrel 10 has a head 28 which contains a sectoral cutout 29 in which there can be swung, by turning the core rod 22, a stop pin 30 fixedly lodged in and projecting radially from the core rod so as to limit the angular extent of turning of the core rod relatively to the mandrel, and vice-versa.

The core rod 22 has at its large end a head 33 integral therewith which is slotted diametrically to hold a rigidly attached, radially disposed handle 34 shaped to serve also as a test gage for testing sizes of blank tubing that are of the right size to be beaded by use of the tool. Handle 34 is secured in head 33 by a cross pin 36.

In using the tool with its parts assembled as shown in FIGS. 1, 2, and 6, the tubing 14 to be beaded may be held firmly in a hand clamp 41 that is tightened by a thumb screw 42. Screw 42 extends through and has threaded engagement with a cross bar 44 that is slidable on guide posts 45 which are anchored in the lower half of the split hand clamp 41 so that turning down the screw 42 against the top surface of the upper half of the clamp pulls the lower half of the clamp upward toward the upper half, guide posts 45 sliding through the latter. When the thumb screw is loosened sufficiently clamp 41 can be removed lengthwise from the tubing. The separable body sections of clamp 41 are lined with semicylindrical half bushings 43 of a suitable grade of tube gripping rubber, plastic or other friction affording substance.

With tubing 14 held from turning by the hand clamp 41, the improved beading tool is inserted in the open mouth of the tubing with the embossing balls 19 fully retracted inward of the walls of the mandrel so as not to interfere with such insertion of the tool. The inside diameter or diameters of the tubing that are to be beaded are snugly filled by the mandrel 10 with a slip fit. Handle 34 may then be swung in the direction indicated by the arrows, clockwise in FIGS. 3 and 4 (counterclockwise in FIG. 5), to turn core rod 22 an angular extent relatively to mandrel 10 that is permitted and limited by the rotary play of stop pin 30 in the sectoral cutout 29 in the mandrel head 28.

At the beginning of such relative turning, binding of balls 19 in the narrowing space between cam surface 23 and the internal surface of the tubing will ordinarily take place automatically as occurs in the well known forms of ball wedging, one-way clutches. If for any reason the balls fail to so wedge and bind, such action can be assured by even a light detentive grasp of the operator's fingers on the mandrel head 28 which is accessible for that purpose while the core rod handle 34 is being swung. This initial degree of limited turning of the core rod relative to the mandrel causes the camming surfaces 23 of the core rod to force the embossing balls 19 radially outward beyond the periphery of the mandrel to their position indicated in FIGS. 4 and 6 which causes them to indent the wall of the tubing at the spot that is opposite the ball.

Further continued turning of core rod 22 by its handle 34, clockwise in FIG. 4 (counterclockwise in FIG. 5), causes the mandrel to turn in unison with the core rod while the tubing is still prevented from turning by hand clamp 41. Each embossing ball is thus impelled by its mandrel opening 18 to revolve about the axis of the tubing for any desired angular extent up to and including 360 degrees while the ball is held in a position projecting from the periphery of the mandrel by the circumferential surface of the core rod. Thus the initial outward indentation of the tubing wall shown in FIG. 4 becomes an embossed circumferential bead 46 of any desired arcuate extent. At any point in the generating of such bead, handle 34 can be swung in reverse direction, as permitted by the play of pin 30 in cutout 29, and this will permit the balls 19 to retract inward of the mandrel. The balls can thus be freed at any time from the bead which they have formed, permitting the tool to be withdrawn from the mouth of the tubing.

The following claims are directed to and intended to cover not only the particular construction and relationship of parts herein chosen to illustrate an embodiment of the invention but also equivalents thereof incorporating the same principles and coming within a broad interpretation of the terms used in the claims.

What is claimed is:

1. A rectilinear hand tool for embossing circumferential beads at axially spaced locations in the wall of cylindrical tubes of different diametrical size, comprising in combination, a hollow mandrel having coaxial cylindrical wall portions of relative large and relatively small diametrical sizes united rigidly end to end and adapted to be inserted endwise in a tube to be embossed, a core rod so arranged within said mandrel that relative movement of said rod and mandrel is confined to rotation about a common axis, a plurality of axially spaced apart camming surfaces on said core rod located at respectively differing radial distances from said common axis, lateral openings located respectively in said wall portions in axial register with said camming surfaces, and embossing balls in said wall openings having a limited range of radial movement with respect to said mandrel at respectively different distances from said common axis of rotation, said balls being operably related to said camming surfaces for embossing work tubes of different diameter when similarly aligned longitudinally with said common axis.

2. A compact unitary hand tool as defined in claim 1, in which the said mandrel and the said core rod are of diminishing diameter toward the end of the tool to be inserted in the said tubing.

3. A compact unitary hand tool as defined in claim 2, in which the said mandrel and the said core rod have separately graspable handles at the opposite end of the tool accessible outside of the said tubing for independently turning said mandrel and said core rod.

4. A compact unitary hand tool as defined in claim 3, in which the said mandrel is stepped between said different wall portions thereof and the said core rod is stepped between its said peripheral surfaces of differing girths in a manner to afford internal thrust shoulders in said mandrel abutting external thrust shoulders on said core rod for determining and maintaining constant axial relationship of said rod to said mandrel.

5. A compact unitary hand tool as defined in claim 4, in which the smallest end of the said core rod protrudes from the smallest end of the said mandrel, together with a thrust element removably secured on said protruding end of said core rod to oppose axial separation of the said thrust shoulders when the tool is in use.

6. A compact unitary hand tool as defined in claim 4, in which the entire thickness of the said cylindrical wall of the said mandrel has a jogged annular profile shape separating the said portion of said wall.

References Cited

UNITED STATES PATENTS 2,377,406   6/1945   Dedrick _____ 72—75
2,526,932   10/1950  Champion _____ 72—75

CHARLES W. LANHAM, *Primary Examiner.*

H. D. HOINKES, *Assistant Examiner.*